United States Patent Office 3,635,896
Patented Jan. 18, 1972

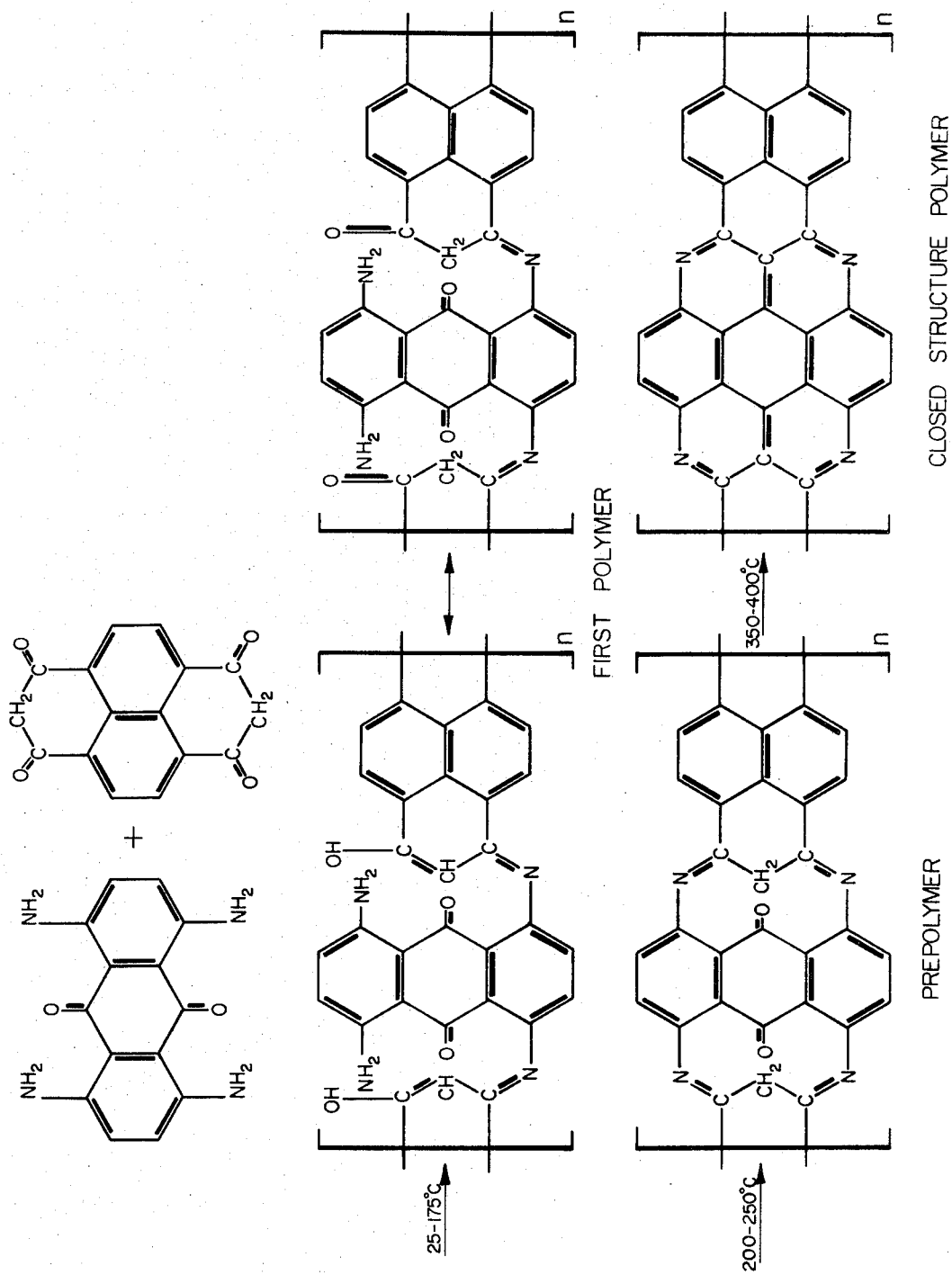

3,635,896
POLYMER WITH GRAPHITE-TYPE STRUCTURE PREPARED FROM TETRAAMINOANTHRAQUINONE AND NAPHTHALENE - 1,8,4,5-DIINDANDIONE
Carl S. Marvel, Tucson, Ariz., William Bracke, Brussels, Belgium, and Prabir K. Dutt, Tucson, Ariz., assignors to Research Corporation, New York, N.Y.
Filed Dec. 12, 1969, Ser. No. 884,612
Int. Cl. C08g *15/00*
U.S. Cl. 260—65                                    2 Claims

ABSTRACT OF THE DISCLOSURE

The stepwise condensation of 1,4,5,8-tetraaminoanthraquinone with naphthalene-1,8,4,5-diindandione yields a polymer with a graphite-type structure. The polymer exhibits a high degree of thermal stability and can be used to prepare articles intended for use at elevated temperatures.

---

This invention relates to a polymer having a graphite-type structure.

The composition of the present invention is a highly condensed, nitrogen-containing heterocyclic polymer characterized by having a graphite-type structure and a high degree of thermal stability. The composition is useful in the preparation of oxidation- and corrosion-resistant articles capable of withstanding temperatures up to and in excess of 500° C.

More specifically, the polymer composition of the present invention is characterized by the presence of the following recurring structural unit:

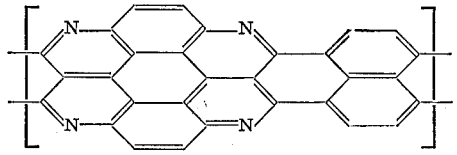

poly(phenaleno[1,2,3 - i,j]anthra[1,9,8 - cdef:4,10,5-c'd' e'f']di[2,7]naphthyridine-2,3:10,11-tetrayl).

The polymeric composition of the present invention is prepared by the condensation of equivalent amounts of 1,4,5,8-tetraaminoanthraquinone with naphthalene-1,8,4,5-diinandione initially in a high boiling polar solvent such as dimethylacetamide or polyphosphoric acid. Without limiting our invention to any particular theoretical mode of operation, it is believed that the condensation proceeds stepwise as illustrated in the accompanying drawing.

Heating of the reactants at temperatures up to about 175° C. in a solvent yields a first polymer having an open structure. As shown, this first polymer results from the head and tail reaction of amino groups from the anthraquinone reactant with carbonyl groups of the diindandione reactant. Further heating of the first polymer at about 200–250° C. in the absence of a solvent yields a prepolymer wherein the polymer structure is partially closed by cross-reaction of adjacent amino and carbonyl groups. Finally, heating of the prepolymer at about 350–400° C. results in cross-condensation of the anthraquinone carbonyl groups with adjacent methylene groups to yield a closed structure polymer.

Our invention is further illustrated by means of the following non-limiting examples:

(I) PREPARATION OF REACTANTS (A) 1,4,5,8-tetraaminoanthraquinone was prepared by the hydrolysis and then reduction of 1,5-diacetamino-4,8-dinitroanthraquinone according to the method of Noelting and Wortmann, Ber. 39, 643 (1906).

(B) Naphthalene-1,8,4,5-diindandione was prepared by the condensation of 1,4,5,8-napthhalene tetracarboxylic dianhydride with diethyl malonate in the presence of anhydrous zinc chloride according to the method of Freund and Fleischer, Ann., 402, 77 (1913).

(II) POLYCONDENSATION (A) In dimethylacetamide.—A mixture of 0.268 g. of 1,4,5,8-tetraaminoanthraquinone and 0.264 g. of naphthalene-1,8,4,5-diindandione was placed in a flask equipped with a mechanical stirrer. A mixture of 15 ml. of dimethylacetamiide and 2 ml. of acetic acid was added and the reaction mixture heated for 15 hours at 165° C. under a stream of nitrogen. The first polymer, which became insoluble during the course of the reaction, was separated and purified by extraction with alcohol and then with dimethylacetamide. The yield of purified first polymer was 70% of the theoretical; it was soluble in sulfuric acid ($\eta$inh=0.39, 0.2 g./100 ml. at 30° C.). Its elemental analysis and infrared spectrum were consistent with the structure shown in the drawing.

The first polymer was heated under vaccuum for 20 hours at 200–250° C. The prepolymer obtained analyzed 79.1% C, 3.6% H and 9.9% N. Its analysis and infrared spectrum were consistent with the structure shown in the drawing.

The prepolymer was heated under vacuum for 10 hours at 300° C. and for another 10 hours at 350–400° C. The closed structure polymer obtained was almost completely insoluble in concentrated sulfuric acid and analyzed 84.5% C, 2.2% H and 11.3% N (there was a residue of 0.9%- polymers of this type are difficult to burn completely). The analysis was consistent with the structure shown in the drawing. The name of the polymer, based on the proposed nomenclature rules developed by the Nomenclature Committee of the Division of Polymer Chemistry, American Chemical Society, is poly(phenaleno[1,2,3-i,j]anthra [1,9,8 - cdef:4,10,5-c'd'e'f']di[2,7]naphthyridine - 2,3:10, 11-tetrayl).

(B) In polyphosphoric acid.—The same quantities of reactants as in the previous example were placed in 15 ml. of polyphosphoric acid at room temperature. The reaction vessel was continuously swept with a stream of nitrogen as the reaction temperature was slowly raised to 120° C. and maintained at that temperature for 10 hours. The reaction temperature was then slowly raised to 190° C. over a period of 10 hours and kept at that temperature for 4 hours. The viscous reaction mixture was poured in water, the polymer separated and successively extracted with water for two days, with alcohol for one day and finally with dimethylacetamide for one day. The yield of black powdery first polymer was 82% of the theoretical after drying at 60° C. under vacuum. The first polymer was converted to prepolymer and closed structure polymer by heat treatment as described in the previous example. The sulfuric acid insoluble product analyzed 84.8% C, 2.5% H and 11.9% N with a 1.3% residue.

(III) FIBER FORMATION

The prepolymer made by the method of either of the previous examples was soluble both in a mixture of 80% dimethyl sulfoxide in water containing 10% $Na_2S_2O_4$ and 10% KOH under $N_2$ atmosphere (solubilized by reduction) and in concentrated sulfuric acid. A 8% solution of the polymer was made in either case and was wet spun into a fiber; these solutions could also be cast as films or other shaped articles. Thermal treatment of the prepolymer fibers or film (heating at 350–400° C.) converts the prepolymer to closed structure polymer with a graphite-type structure stable at temperatures up to and in excess of 500° C. (thermogravimetric analysis showed good stability up to 550° C. under nitrogen). The fibers, generally mixed with other fibers, may be woven or knit into fabrics resistant to corrosion and to the action of moisture and oxygen at elevated temperatures.

Other variations in our invention will suggest themselves to those skilled in the art and our invention is as claimed.

We claim:

1. A closed structure film and fiber forming polymer consisting essentially of the recurring structural unit:

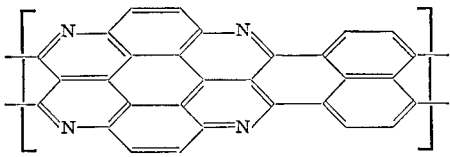

2. A film and fiber forming prepolymer consisting essentially of the recurring structural unit:

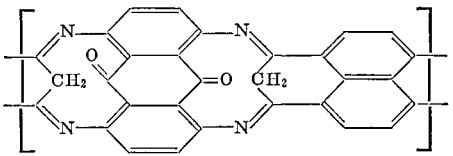

References Cited

UNITED STATES PATENTS

| | | | |
|---|---|---|---|
| 3,198,767 | 8/1965 | Matsuda et al. | 260—65 |
| 3,493,541 | 2/1970 | Gall | 260—72.5 |

WILLIAM H. SHORT, Primary Examiner

L. L. LEE, Assistant Examiner

U.S. Cl. X.R.

260—30.6, 30.8, 32.6